UNITED STATES PATENT OFFICE 2,297,411

PROCESS OF OBTAINING THE MEAT OF CRUSTACEANS

Wolfgang Henning, Lubeck, Germany; vested in the Alien Property Custodian

No Drawing. Application October 23, 1939, Serial No. 300,839. In Germany November 12, 1938

3 Claims. (Cl. 99—111)

This invention relates to a process of obtaining the meat of crustaceans, particularly shrimps.

The meat of boiled shrimps is usually obtained by manually removing the crust or shell. As this operation requires much time, by far the largest portion of all catches is used for animal food. Mechanical shelling means have been proposed but they are open to the objection that machines of this class have to follow the manual practice in that they must handle and shell each shrimp individually and are therefore unsuited for working such crustaceans on an industrial scale.

The invention attempts to overcome these difficulties by a process in which the meat is obtained from the shrimps in such a condition that it retains all its nutritive properties similar to the meat from manually shelled shrimps, and is suitable for human consumption. The novel process comprises boiling the crustaceans in salt water, depriving the boiled crustaceans of part of their water content until 30 to 40% of the original water content is present to cause shrinking of the meat body or substance and the detachment thereof from the chitinous integument or shell, removing the waste matter from the meat body or substance by trituration and screening, and subjecting the separated meat body or substance to a swelling process in water to regain its original shape, appearance and quality.

According to the invention, crustaceans boiled in salt water in known manner are deprived of part of their water content by subjecting them to centrifuging, drying by heat, or to the action of a water absorbing dry substance, salt, etc., or of a salt solution to cause the meat to shrink somewhat and to come off the chitinous integument or shell, whereupon the waste matter is detached by trituration from the meat body and remains unaffected thereby and is then removed by screening. Instead of depriving the crustaceans of water the latter may be converted into another state of aggregation by rapid freezing.

It is known to dry boiled shrimps and since they could not be used for human consumption they were used as animal food by grinding the shrimps after complete drying. A treatment of crustaceans permitting, according to the invention, the swelling of the meat body or substance in water obtained by trituration and screening of the waste matter, is neither intended nor attained by the known drying process, since the known quick drying required for grinding the entire bodies renders swelling of the meat body impossible.

It is the object of the invention, however, to obtain the meat of crustaceans and to use for animal feeding purposes only the waste matter, as the integument or shell, head and inner organs.

According to the invention, the crustaceans are boiled in salt water on the vessels in which they are caught and they are then immediately or subsequently placed in a centrifuge to remove the water adhering thereto and to deprive the meat of a part of its water content so that, due to shrinking, it will separate from the shell. The same effect may be obtained by passing the crustaceans through a heated drying device or by storing them for some time in a water absorbing dry substance like salt, etc. or in a salt solution. The integument, which has become brittle by this treatment, together with the other hardened waste matter is then detached by trituration from the meat body which remain whole and are removed by screening, preferably by employing a revolving screen of the type used for instance in cleaning berries.

The employment of a rapid freezing process, whereby the state of aggregation of the water content of the crustaceans is changed, produces the same results, because the chitinous integument, rendered hard and brittle thereby, can be easily rubbed off from the hardened meat body and removed by screening.

The meat obtained represents a product that will keep for a long time and can be immediately or subsequently prepared into food for various purposes. For example, the meat may be swelled in water to recover its fresh appearance, though in case of heat treatment this is possible only if drying is effected at moderate heat and only to an extent that the water content of the meat body does not fall below 30% to 40%.

It has been found that the taste of the meat can be considerably improved by adding flavoring matter to the swelling liquid, particularly meat juices or meat extracts, whereby not only the taste is improved but also the keeping quality of the shrimp meat is not inconsiderably enhanced due to the colloidal property of the meat juices.

The flavoring matter mentioned is preferably used in the form of aqueous solutions which may be added to the swelling liquid prior to, during or shortly before the completion of the swelling step.

The integument detached by trituration from the meaty structure, which remains whole, disintegrates together with the other triturable waste matter consisting mainly of the inner organs of the crustaceans as nutritive substance and forms a coarsely granular powder which when ground and if desired mixed with other substances yields a valuable stock feed, especially suitable for chickens.

I claim:

1. Process of obtaining the meat of crustaceans, particularly shrimps, comprising boiling the crustaceans in salt water, depriving the boiled crustaceans of part of their water content until 30 to 40% of the original water content is present to cause shrinking of the meat body and the detachment thereof from the chitinous integument or shell, removing the waste matter from the meat body by trituration and screening, and swelling the separated meat body in water to regain its original shape, appearance and quality.

2. Process according to claim 1, in which the crustaceans are subjected to rapid freezing before packing the meat body to change the state of aggregation of the water.

3. Process according to claim 1, in which a flavoring substance is added to the meat body during the swelling step.

WOLFGANG HENNING.